United States Patent
Upadhye et al.

(10) Patent No.: US 9,525,717 B2
(45) Date of Patent: Dec. 20, 2016

(54) SYSTEM FOR AND METHODS OF PROVIDING COMPUTER TELEPHONY INTEGRATION SERVICE ORIENTED ARCHITECTURE

(71) Applicant: Cellco Partnership, Basking Ridge, NJ (US)

(72) Inventors: Anand M. Upadhye, East Brunswick, NJ (US); Ashraf Afifi, Flemington, NJ (US); Sajid Ahmed, Monmouth Junction, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 483 days.

(21) Appl. No.: 13/781,895

(22) Filed: Mar. 1, 2013

(65) Prior Publication Data

US 2014/0250318 A1 Sep. 4, 2014

(51) Int. Cl.

| | |
|---|---|
| *G06F 11/00* | (2006.01) |
| *H04L 29/08* | (2006.01) |
| *G06F 11/20* | (2006.01) |
| *H04M 3/00* | (2006.01) |
| *H04L 29/14* | (2006.01) |
| *H04M 3/51* | (2006.01) |
| *G06F 11/07* | (2006.01) |

(52) U.S. Cl.
CPC ........... *H04L 67/02* (2013.01); *G06F 11/0709* (2013.01); *G06F 11/0757* (2013.01); *G06F 11/2002* (2013.01); *H04L 67/1034* (2013.01); *H04L 69/40* (2013.01); *H04M 3/00* (2013.01); *H04M 3/5183* (2013.01); *G06F 11/2033* (2013.01); *G06F 11/2041* (2013.01); *H04M 2203/404* (2013.01)

(58) Field of Classification Search
CPC .................................................. G06F 11/3051
See application file for complete search history.

(56) References Cited

U.S. PATENT DOCUMENTS

| | | | | |
|---|---|---|---|---|
| 6,246,666 | B1 * | 6/2001 | Purcell et al. | 370/221 |
| 7,487,233 | B2 * | 2/2009 | Iwamoto et al. | 709/223 |
| 2005/0220290 | A1 * | 10/2005 | Ambrose et al. | 379/266.07 |
| 2008/0219429 | A1 * | 9/2008 | Mandalia et al. | 379/266.02 |
| 2013/0136251 | A1 * | 5/2013 | Omiya | 379/265.05 |

OTHER PUBLICATIONS

Microsoft Computer Dictionary, Microsoft Press, 1999, 4th ed., pp. 223, 253.*

* cited by examiner

*Primary Examiner* — Christopher McCarthy

(57) ABSTRACT

A system and method for providing a Computer Telephony Integration Service Oriented Architecture is presented. The system and method may include providing one or more computer telephony integration servers in one or more clusters to deliver telephony events between agents and peripheral devices. The events may be solicited or unsolicited. The clusters may be stateless and scalable. The clusters may include dynamic message routing. The systems and methods may implement one or more recovery algorithms if one or more of the telephony integration servers experiences a failure event.

22 Claims, 12 Drawing Sheets

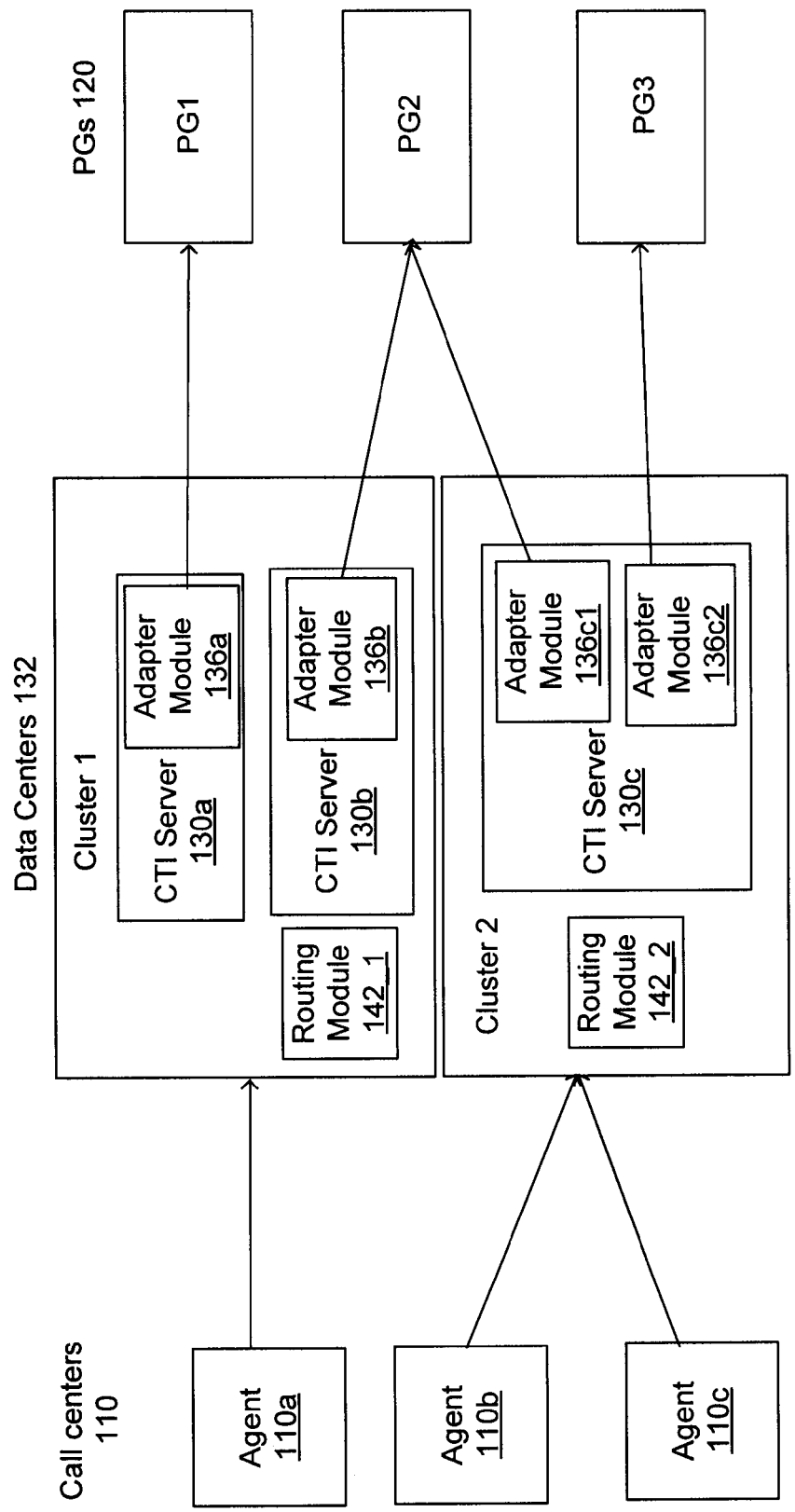

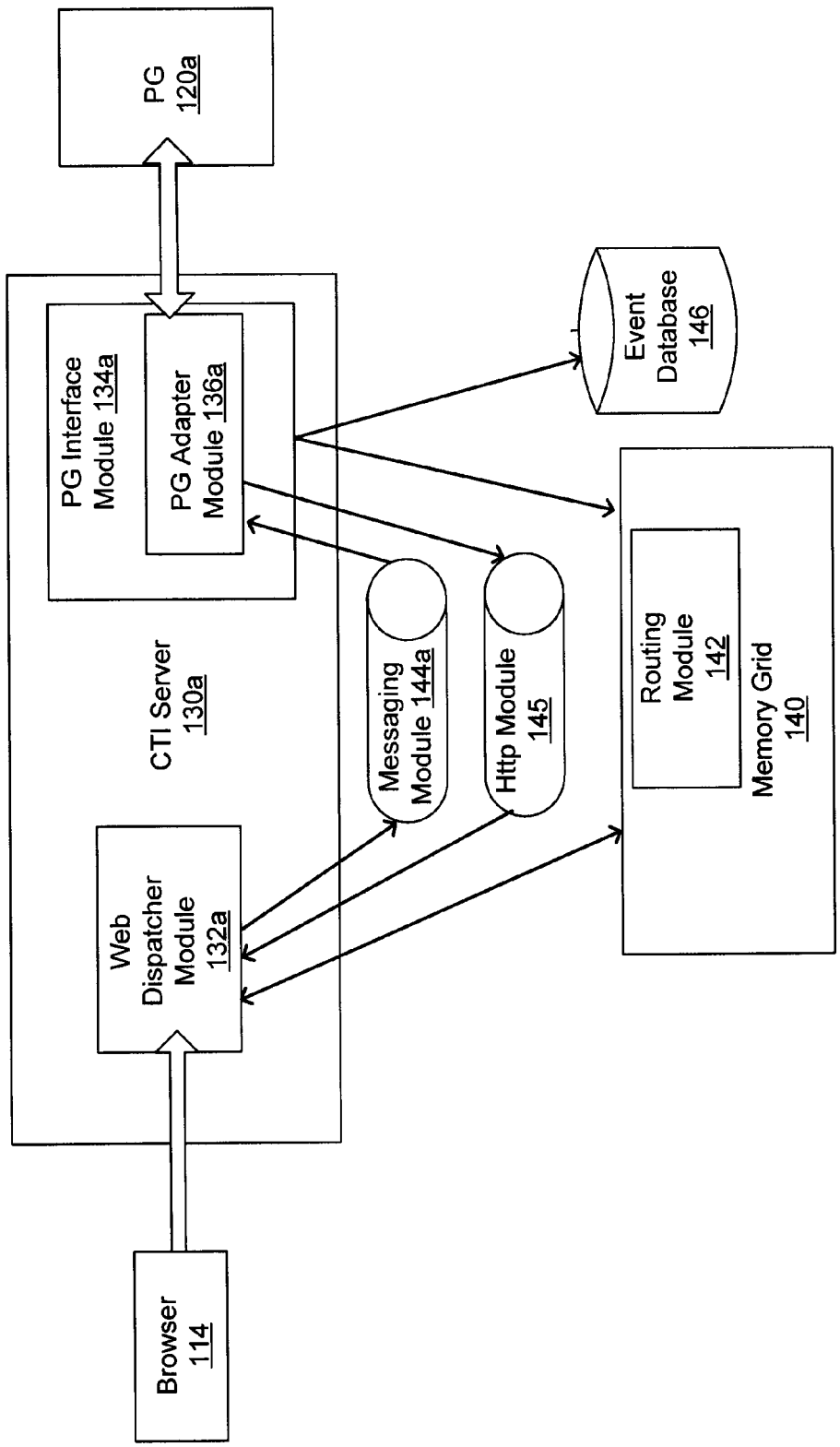

Figure 4

Agent map 410

| Agent id | Agent IP Address | Agent port | Agent security key | PG id | PG JMS Queue |
|---|---|---|---|---|---|
| Agent123 | 10.4.5.6 | 5000 | KwzOfj012 | PG1 | PG1_Queue |

PG Configuration map 420

| PG id | JMS Queue | PG address | Configured server | Actual server | status |
|---|---|---|---|---|---|
| PG1 | PG1_Queue | 10.5.5.5 | Server1 | | Available |

Server configuration map 430

| Server id | Server status | JMS Topic |
|---|---|---|
| Server1 | Up | ClusterTopic |

Server heartbeat map 440

| Server id | Heartbeat timestamp |
|---|---|
| Server1 | Dec 12, 2012 11:0:0 |

Contention Map 450

| PG Manager key | Timestamp |
|---|---|
| kG123a_2 | Dec 12, 2012 11:0:1 |

500

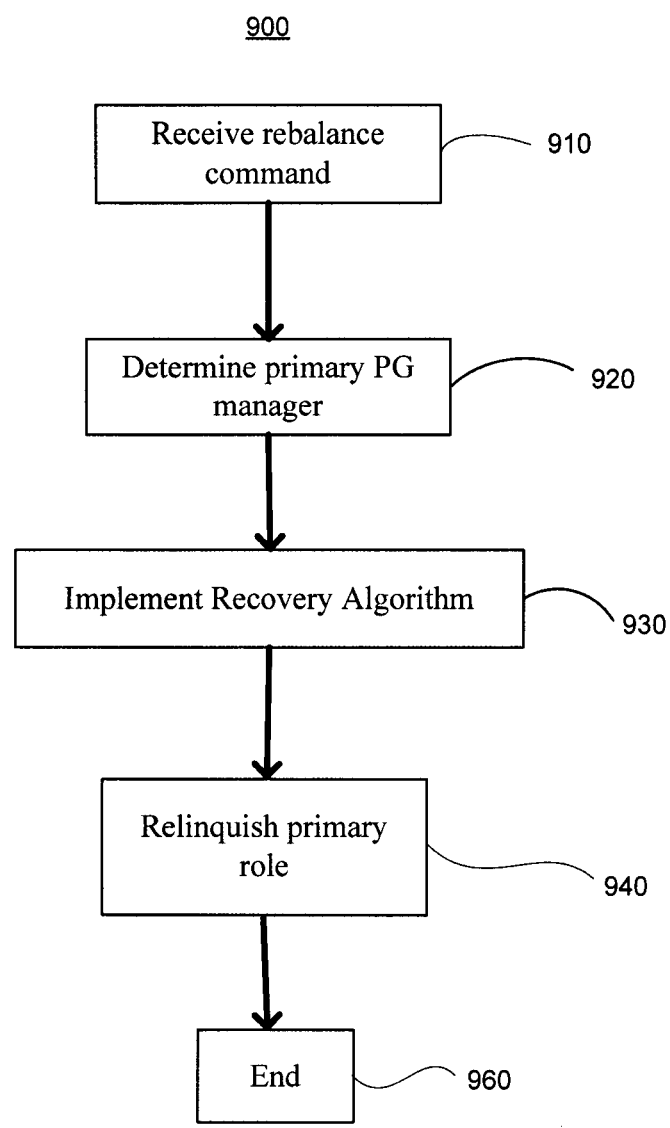

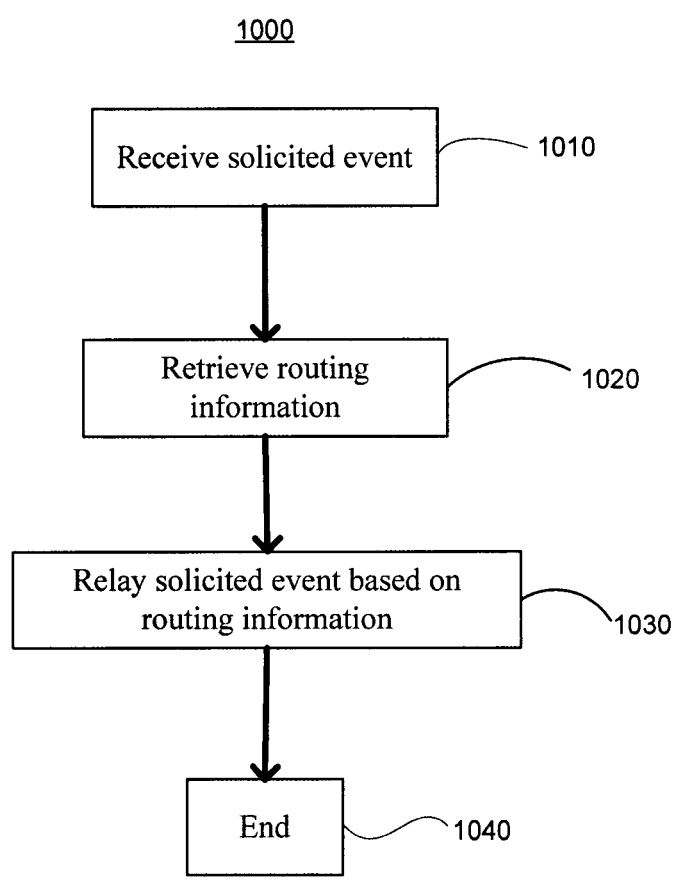

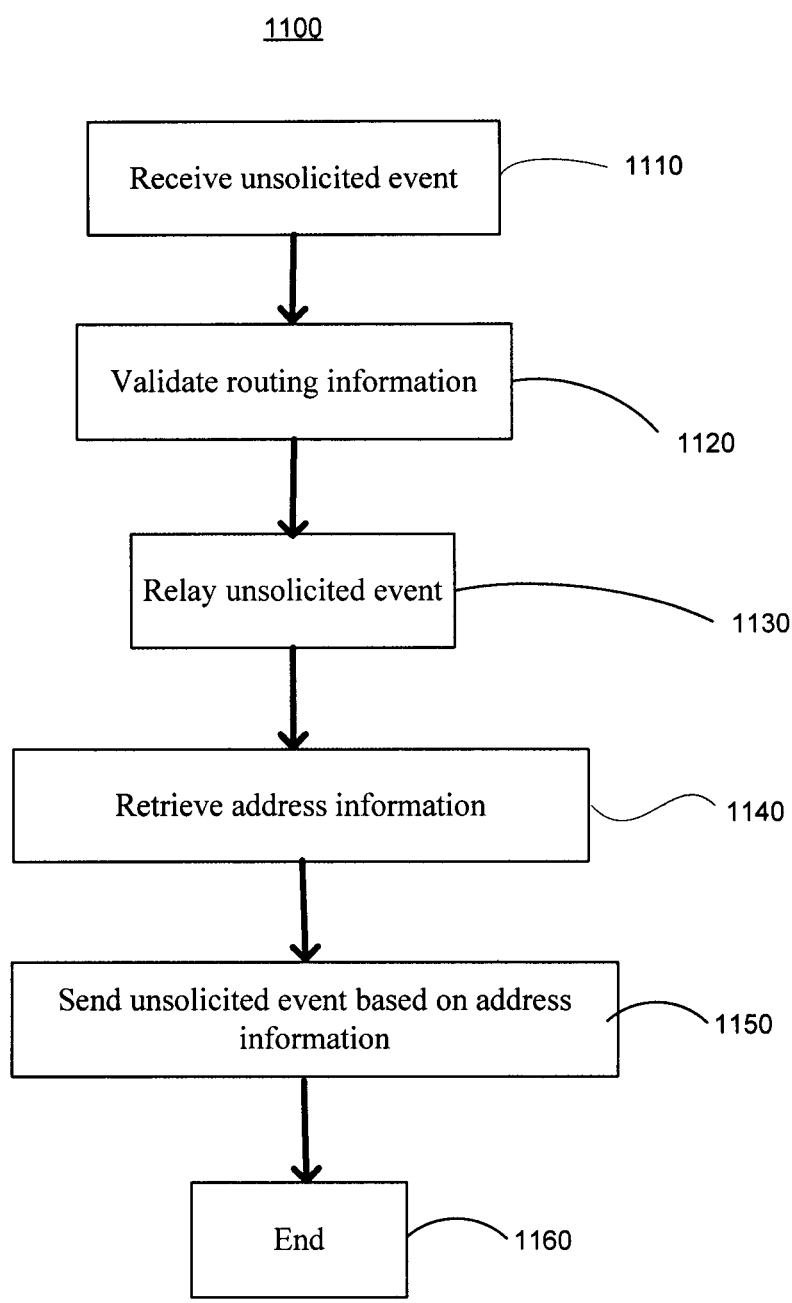

SYSTEM FOR AND METHODS OF PROVIDING COMPUTER TELEPHONY INTEGRATION SERVICE ORIENTED ARCHITECTURE

BACKGROUND INFORMATION

FIG. 1A is a schematic diagram illustrating a system for call routing between one or more agents 110a-110x and one or more peripheral gateway (PG) servers 120 (also referred to herein as merely PG). Each agent maintains a direct TCP/IP connection to one PG 120. For example, if there are 2,000 agents using the system, there will need to be 2,000 TCP/IP connections to the PG 120. Solicited events passing from an agent to a PG will be directly routed to that PG via the designated TCP/IP connection. Likewise, unsolicited events from a PG to an agent will be directly routed to that agent via the appropriate TCP/IP connection.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which:

FIG. 2 is a block diagram of a hardware component of the system according to a particular embodiment;

FIG. 3 is a block diagram of a hardware component of the system according to a particular embodiment;

FIG. 4 is a graphical representation of routing data of a particular embodiment;

FIG. 9 is a flowchart illustrating the functionality of a particular embodiment;

FIG. 10 is a flowchart illustrating the functionality of a particular embodiment; and FIG. 11 is a flowchart illustrating the functionality of a particular embodiment.

DETAILED DESCRIPTION OF PREFERRED EMBODIMENTS

A Computer Telephony Integration (CTI) Service Oriented Architecture (SOA) arrangement may include one or more CTI servers that are interposed between one or more PG servers and one or more agents. According to an embodiment of the present invention, the one or more CTI servers may be grouped in one or more clusters, where the clusters may route solicited events between the one or more agents and the one or more PG servers. The clusters may pass unsolicited events between the one or more PG servers and the one or more agents. The routing may be stateless. The clusters may be scalable. The CTI SOA arrangement may allow any agent to connect to any PG server without the need for a designated TCP/IP connection.

Figure 1A:
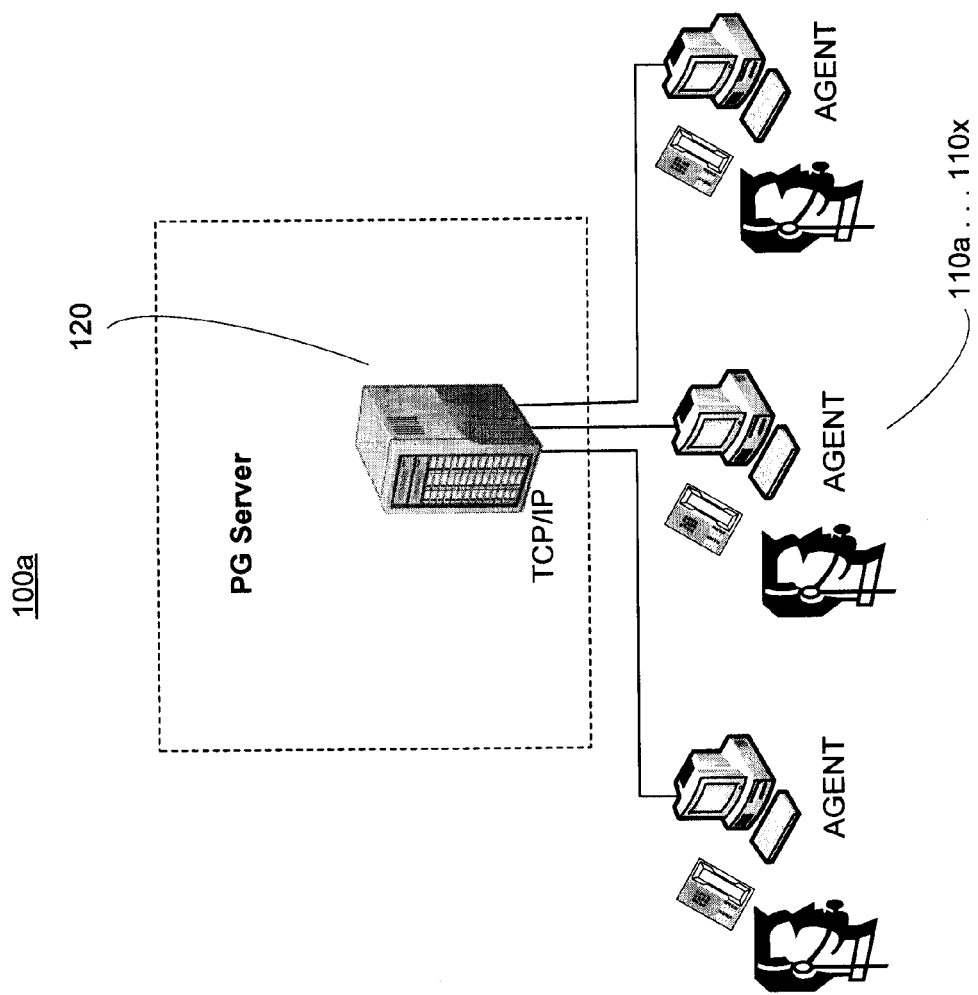
FIG. 1A is a schematic diagram illustrating a prior art system.
Figure 1B:
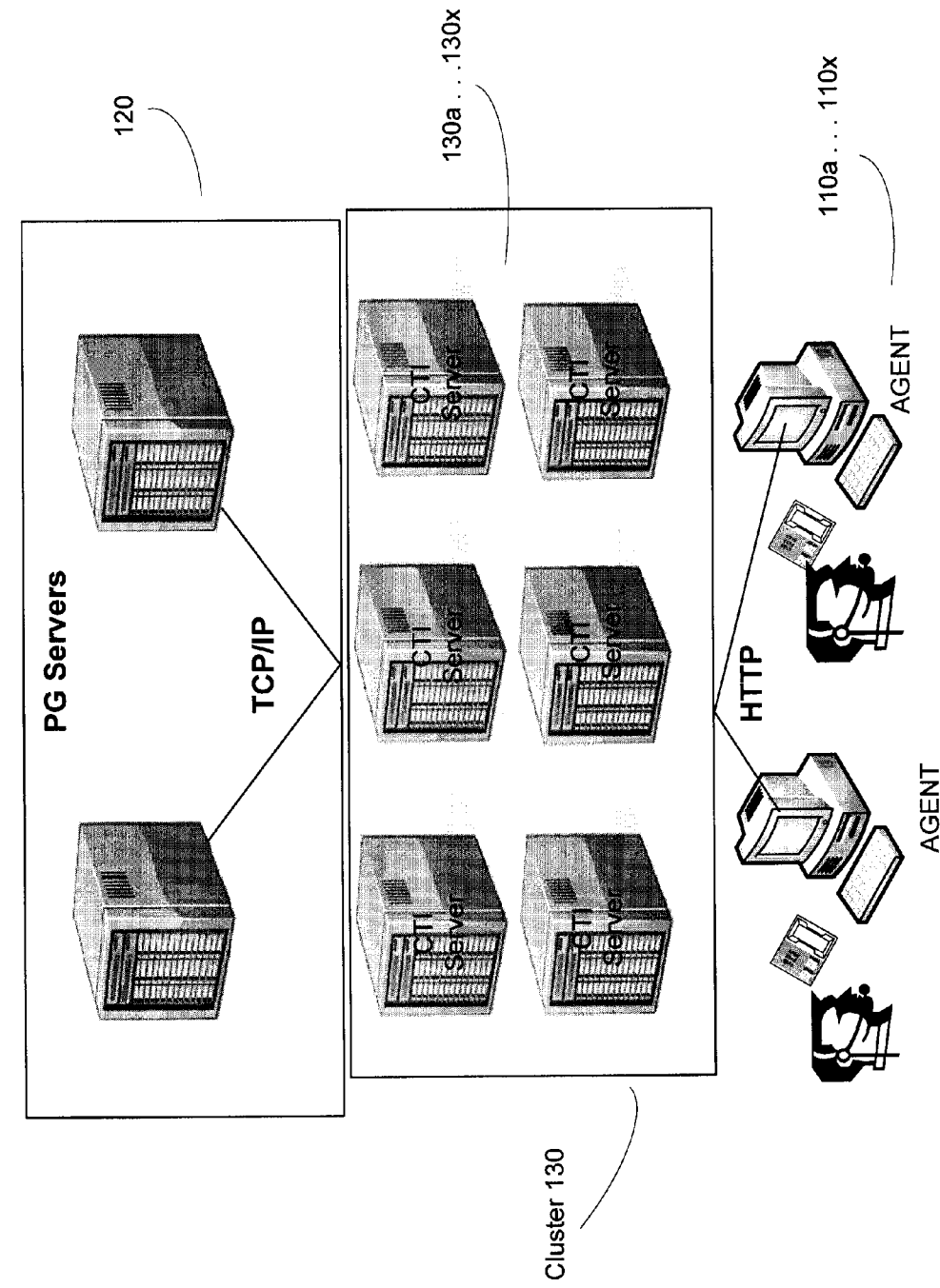
FIG. 1B is a schematic diagram illustrating a system according to a particular embodiment.

FIG. 1B is a schematic diagram of an exemplary embodiment of a CTI SOA arrangement. As shown in FIG. 1B, Computer Telephony Integration (CTI) Service Oriented Architecture (SOA) 130 is interposed between the one or more agents 110 and the PGs 120. The CTI SOA system may be stateless and scalable. For example, the scalable CTI SOA system may be device agnostic, thereby permitting the system to interface with multiple peripheral device platforms. The stateless CTI SOA system may allow an agent to transmit solicited events to any peripheral gateway server that is connected to a CTI server. CTI SOA 130 may comprise a collection of one or more CTI servers 130a-130x. Furthermore, the agents may connect using one or more HTTP connections to the one or more CTI servers 130a-130x. The one or more CTI Servers 130a-130x may be a cluster of servers. Hereinafter, a "cluster" will be used to denote a collection of one or more CTI Servers. The CTI servers may be websphere servers that deliver events between the one or more PGs 120 and the one or more agents 110. For example, the one or more CTI servers may be IBM Websphere 8.0 J2EE servers.

FIG. 2 is a schematic diagram of several clusters, according to an exemplary embodiment. As shown in FIG. 2, agents may operate out of one or more call centers 110. The one or more clusters may be stored at one or more data centers 132. The one or more PG servers 120 may be stored at one or more data centers, or call centers. As shown in FIG. 2, each data center may include one or more clusters. Cluster 1 may include CTI Servers 130a and 130b. Each CTI Server in a cluster may include one or more Adapter Modules, to be described in greater detail in FIGS. 3 and 5. Each Adapter Module may connect to one PG. So, for example, CTI Server 130a may comprise Adapter Module 136a, which may connect to PG1. Similarly, CTI Server 130b may comprise Adapter Module 136b, which may connect to PG2. CTI Server 130c in Cluster 2 may comprise two adapter modules, 136c1 and 136c2, which may connect to PG2 and PG3, respectively. Thus, as shown multiple PG servers may be connected with the same CTI server and/or multiple CTI servers may be connected with the same PG server through the respective Adapter Module. In an exemplary embodiment, there may be a 1:1 ratio between adapter modules and PG servers. Agent 110a may have one or more network connections with cluster 1, while agents 110b and 110c may have one or more network connections with cluster 2, via one or more browsers. In an exemplary embodiment, a single socket connection may serve multiple agents and/or browsers. A socket may be a software endpoint that establishes bidirectional communication between one or more CTI Servers and one or more agents/browsers. Other configurations and architectures may be implemented.

As used herein, the term "network" may be a wireless network, a wired network or any combination of wireless network and wired network. For example, a network may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, a network may include, without limitation, telephone line, fiber optics, IEEE Ethernet 802.3, a wide area network ("WAN"), a local area network ("LAN"), or a global network such as the Internet. Also, a network may support, an Internet network, a wireless communication network, a cellular network, or the like, or any combination thereof. A network may further include one, or any number of the exemplary types of networks mentioned above operating as a stand-alone network or in cooperation with each other. A network may utilize one or more protocols of one or more network elements to which it is communicatively coupled. A network may translate to or from other protocols to one or more protocols of network devices.

FIG. 3 illustrates a schematic diagram of the components of CTI Server 130a according to a particular embodiment. CTI Server 130a may interact with one or more agents via Browser 114. Different agents may, of course, use different browsers (such as Internet Explorer, Chrome, Firefox, Safari, etc. . . . ). Each agent may have it's own unique browser to connect to one or more CTI Servers. One or more agents may use one or more browsers to connect to a single socket for a CTI Server, or a single socket for a cluster of CTI Servers. CTI Server 130a may be communicatively coupled to one or more PGs, such as PG 120a. CTI Server 130a may comprise a web dispatcher module 132a, one or more PG adapter modules 136a, and a PG interface module 134a. CTI Server 130a may be communicatively coupled to Memory Grid 140 for routing information.

CTI Server 130a may be part of a cluster (such as cluster 1, shown in FIG. 2). Web Dispatcher Module 132a may handle traffic (e.g., http traffic) from Browser 114. Browser 114 may be accessible by one or more agents 110a-110x via one or more networks to facilitate communication between the agents and one or more PGs. Web Dispatcher Module 132a may push asynchronous call events from PG 120a to Browser 114. An asynchronous call event may be an unsolicited event sent from PG 120a to Browser 114 for delivery to a specific agent. The process of communicating asynchronous call events from a PG device to an agent will be discussed in greater detail later in this application in connection with FIG. 11.

According to an exemplary embodiment, Web Dispatcher Module 132a may receive one or more solicited events from Browser 114. The solicited events may be generated by one or more agents 110a-110x. The one or more solicited events may be telephony requests to a PG. Web Dispatcher Module 132a may dispatch the solicited events to one or more PG Adapter Modules 136a via Messaging Module 144a. The process of transmitting solicited events from an agent to a PG device will be discussed in greater detail in this application in connection with FIG. 10.

Messaging Module 144a may communicate with PG 120a. Web Dispatcher Module 132a may use Messaging Module 144a to transmit one or more solicited events to PG 120a. In one exemplary embodiment, Messaging Module 144a may be a Java Messaging Service (JMS) queue. Each of the one or more PGs may be associated with one or more Messaging Modules.

PG Interface Module 134a may manage communications between CTI Server 130a and PG 120a. PG Interface Module 134a may also communicate with Memory Grid 140. Each CTI Server in a cluster may correspond to a PG Interface Module. PG Interface Module 134a may activate and/or deactivate PG Adapter Module 136a. The activation and/or deactivation may be in response to one or more commands. This process of activating and deactivating PG Adapter Modules will be discussed in greater detail in conjunction with FIGS. 6-9.

PG Interface Module 134a may log PG events to Event Database 146 using JMS. Event Database 146 may store event information for monitoring and reporting purposes. Event Database 146 may be network accessible storage and may be local, or remote. Event Database 146 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, Event Database 146 may be a database, such as an Oracle database, a Microsoft SQL Server database, a DB2 database, a MySQL database, a Sybase database, an object oriented database, a hierarchical database, or other database. Event Database 146 may utilize flat file structures for storage of data.

PG Adapter Module 136a may be communicatively coupled to a corresponding PG 120a. Each CTI Server in a cluster may have one or more PG Adapter Modules. In a CTI Server, each PG Adapter Module may be communicatively coupled to a PG. PG Adapter Module 136a may facilitate communications between CTI Server 130a and PG 120a. PG Adapter Module 136a may monitor the heartbeat of the corresponding PG 120a, as will be explained later on. PG Adapter Module 136a may send unsolicited events from PG 120a to Web Dispatcher Module 132a via Http Module 145. PG Adapter Module 136a may send unsolicited events to another Web Dispatcher module within the cluster via Http Module 145. PG Adapter Module 136a may receive solicited events from Web Dispatcher Module 132a (sent from Browser 114) and deliver them to the corresponding PG 120a. PG Adapter Module 136a may log PG events to Event Database 146 via PG Interface 134a.

In the exemplary embodiment shown in FIG. 3, unsolicited events (e.g., events sent from a PG to an agent) may be routed to Http Module 145. Http Module 145 may be a JMS queue that is communicatively connected to one or more CTI Servers in the cluster. In other words, each PG Adapter Module for each CTI Server in a cluster may be communicatively coupled to an Http Module. Unsolicited events sent from a PG through its corresponding PG Adapter Module may then be sent to Http Module 145. This way, messages or events passing through the system do not need dedicated wire analogous connections via TCP sockets. This allows for a stateless operation that utilizes the hardware efficiently and allows for realigning the system dynamically in reaction to failures of one or more CTI Servers in a cluster.

Each Web Dispatcher Module in the cluster may be communicatively connected to the Http Module and "listens" for asynchronous (unsolicited) events. When Http Module 145 receives an unsolicited event from a PG Adapter Module, Http Module 145 may push the event to a Web Dispatcher module based on the traffic at the Web Dispatcher Module. In this way, the http Module for the cluster may load balance unsolicited events by distributing them to different web dispatcher modules. In some embodiments, the unsolicited events are distributed evenly among the web dispatcher modules, while in other embodiments the distribution may not be even. The process of delivering an unsolicited event is described in greater detail in connection with FIG. 11.

Unsolicited events may be distributed using TCP sockets that send the asynchronous events directly to a browser via applet based sockets. The asynchronous events may be encrypted. This solution may utilize few cached sockets at each CTI Server that are used to send events to users or agents on demand. One socket can service many agents. As the communication is initiated at the CTI server, both server and network bandwidths may be utilized very efficiently. Socket based Applets may deliver packets directly to javascript.

Memory grid 140 may be a collection of one or more network enabled computers and databases. Memory grid 140 may exist independently of each of the CTI Servers in a cluster. Each CTI Server in a cluster may connect to memory grid 140. Memory grid 140 may comprise a routing module 142.

Routing Module 142 may comprise one or more routing tables (shown in FIG. 4). For example, Routing Module 142 may be an extreme scale cache. Routing Module 142 may be incorporated into Memory Grid 140 and communicatively coupled to each CTI Server in a cluster. Routing Module 142 and Memory Grid 140 may operate independently of the one or more CTI Servers in the cluster. This allows for stateless operation that may utilize the hardware efficiently and allows for realigning the system dynamically in reaction to failures of one or more CTI Servers in a cluster. Routing tables within Routing Module 142 may be populated dynamically by one or more agents. An agent may login to the system using an agent identifier and target PG the agent desires to communicate with. This operation will be explained in greater detail in connection with FIG. 6.

Routing tables may include some static information that has been preprogrammed into the system. Static information may include information showing which Messaging Module 144 is assigned to which PG. So for example, with reference to FIG. 3, static information in the routing table of Routing Module 142 may indicate that messaging module 144a is assigned to PG 120a. Static information may also include information showing which CTI Servers connect to which PGs in an ideal, load-balanced state. Static information may be based on the assumption that all CTI Servers in a cluster are operating.

Each cluster of servers may support a number of different topologies. A topology may denote the arrangement of each of the CTI Servers in a cluster. A topology may denote how many CTI Servers in a cluster are connected to PGs. A topology may include All-Active; Active-Passive; or Hybrid.

In an All-Active topology, all CTI servers in a cluster may be connected to PGs. For example, a CTI server failure may cause affected PGs to be reassigned across the cluster, according to one or more redistribution algorithms (to be described later on). For example, the reassignment may be performed evenly across the cluster. This topology offers an efficient use of hardware. In an Active-Passive topology, multiple idle CTI servers may be included in a cluster. When a CTI server fails, its PG load may be picked up by idle CTI servers. This may happen because idle servers have the least load, so the redistribution algorithm will favor them. In a Hybrid topology, a combination of All-Active and Active-Passive may be applied. Other topologies and variations may be realized.

FIG. 4 illustrates a routing table stored in a cache in Routing Module 142, according to an exemplary embodiment. Routing table may include Agent map 410, PG configuration map 420, Server configuration map 430, Server heartbeat map 440, and Contention map 450. A routing table may include routing data for each of the one or more CTI Servers in a cluster. A routing table may include routing data for one or more agents that transmit call events to one or more PGs via the cluster. A routing table in Routing module 142 may include routing data for one or more PGs that transmit call events to one or more agents via the cluster.

According to an exemplary embodiment, routing table may include Agent map 410. As shown in FIG. 4, Agent map 410 may include Agent id 412, Agent IP Address 414, Agent port number 416, Agent security key 418, PG id 422, and PG JMS Queue 424. Other identifiers and information may be provided. PG id 422 denotes the specific PG that the agent identified by agent id 412 is sending and receiving events to and from. According to the example in FIG. 4, Agent123, shown by 412, connects to PG1, shown by 422. The PG JMS Queue 424 indicates the Messaging Module that communicates events between the Web Dispatcher Module and the PG Adapter Module. In the embodiment in FIG. 4, Agent123 has an IP address of 10.4.5.6, a port number of 5000, and a security key of KwzOfj102. Agent map 410 may be populated each time an agent 110 logs into the system, as will be explained in conjunction with FIG. 6.

Routing table may include PG Configuration map 420. PG Configuration map 420 may include configuration information relating to each of the one or more PG servers 120 that are connected to the CTI Servers in a cluster. Configuration information includes PG id 422, PG JMS Queue 424, PG address 426, Configured Server 428, Actual Server 427, and status 429. PG id 422 includes the name of a given PG. PG JMS Queue 424 includes the name of the Messaging Module that corresponds to the PG. PG address 426 includes the IP address of the PG. Configured Server 428 includes the name of the CTI Server that is originally connected to the PG. Actual Server 427 includes the name of the CTI Server that is currently connected to the PG. Status 429 lists whether the PG is available or unavailable.

Routing table may include Server Configuration map 430. Server configuration map 430 may include configuration data relating to each of the one or more CTI Servers 130a-130x that are part of the cluster. This data may include Server id 432, Server status 434, and JMS Topic 436. Server id 432 denotes the name of a given CTI Server. Server Status 434 indicates whether the listed server is currently available (Up) or unavailable (Down). JMS Topic 436 includes the name of the JMS Topic queue that the listed CTI Server is currently connected to. The function of the JMS Topic Queue will be described in connection with FIG. 5.

Routing table may include Server heartbeat map 440. Server heartbeat map 440 may store heartbeat data for each CTI Server in a cluster. Server heartbeat map 440 includes the server id 432, and heartbeat timestamp 442 for the last heartbeat received. Server heartbeat map 440 will be explained in greater detail in conjunction with FIGS. 8 and 9.

Routing table may include Contention map 450. Contention map 450 may include PG Manager Key 452, and Timestamp 454. Contention map 450 will be explained in greater detail in connection with FIGS. 8 and 9.

Figure 5:
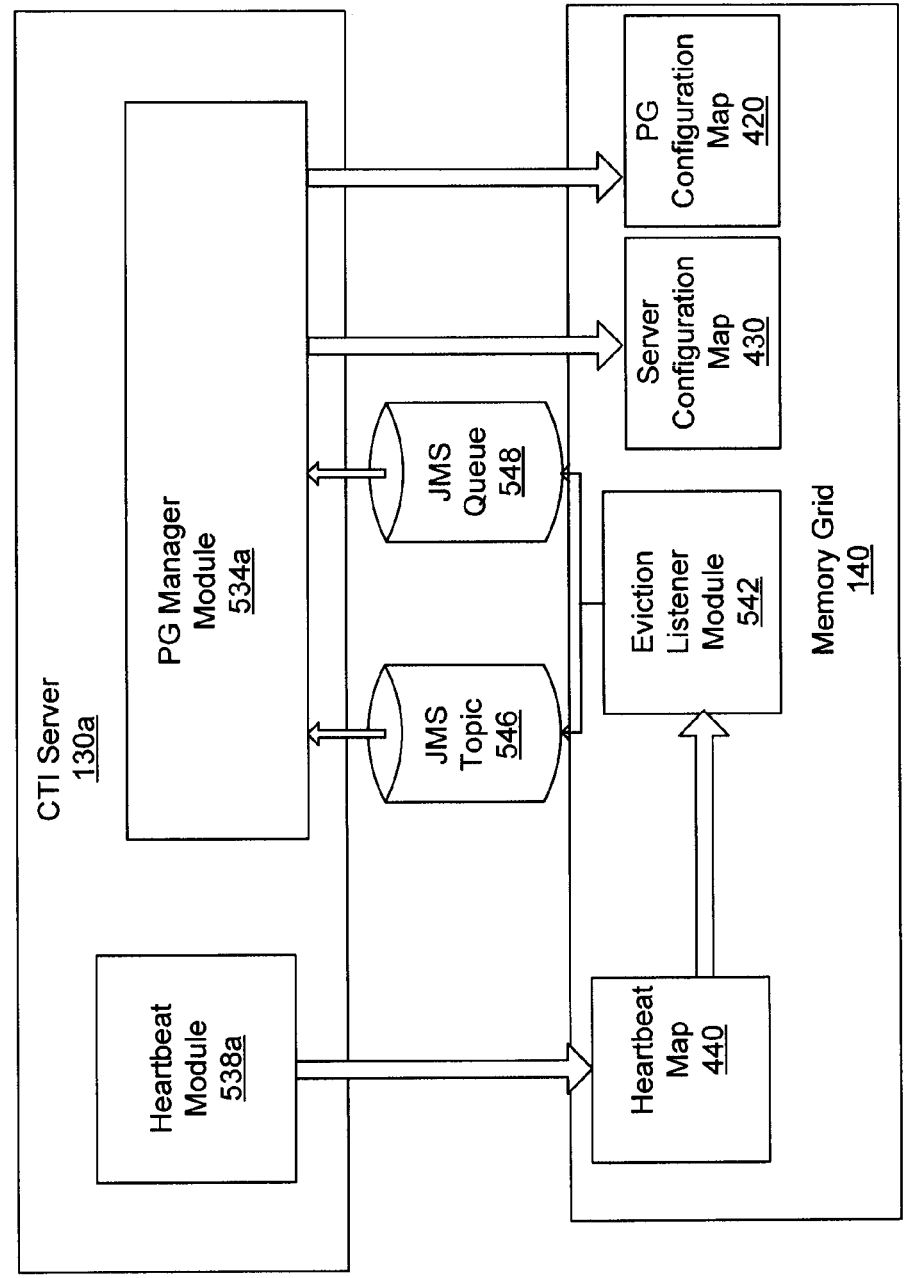
FIG. 5 is a block diagram of a hardware component of the system of a particular embodiment.

FIG. 5 is a schematic diagram of the components of CTI Server 130a that illustrates fault tolerance capabilities of a cluster, according to an exemplary embodiment. The components shown in CTI Server 130a in FIG. 5 may be present in addition to the one or more modules shown in FIG. 3. CTI Server 130a may comprise PG Manager Module 534a, and a heartbeat module 538a. CTI Server 130a may be communicatively coupled to memory grid 140 via JMS Topic Module 546 and JMS Queue Module 548. Memory Grid 140 may include Eviction listener 542.

The PG Manager Module 534a may also act as the PG Interface Module 134a, or it may be a separate module. Each CTI Server in a cluster may have its own PG Manager Module.

CTI Server 130a may include a Heartbeat module 538a. Heartbeat module 538a may be configured to periodically send a heartbeat signal from CTI Server 130a to Memory grid 140. The heartbeat signal may be communicated to Server heartbeat map 440 (as depicted in FIG. 4), which may be part of Routing module 142 (described above). Heartbeat map 440 may include an entry for a heartbeat timestamp 442 corresponding to each CTI Server. The heartbeat timestamp 442 may indicate the time of the last heartbeat signal that was received from the corresponding CTI Server (identified under Server id 432). Heartbeat Module 538a may be configured to send a heartbeat signal every 10 seconds, or any other periodic interval, depending on the system needs. In the event that a CTI Server heartbeat is lost, such as due to a CTI server failure or other failure, Routing Module 142 may evict the CTI server entry from Server heartbeat map 440 and send a signal to Eviction Listener Module 542. The signal includes the Server id 432 and the last timestamp 442 received from that server, as stored in Server heartbeat map 440 of Routing module 142.

If the Eviction Listener Module 542 receives a failure signal from Routing Module 142, Eviction Listener Module 542 transmits this signal to HA Communication bus. HA Communication bus may comprise JMS Topic Module 546 and JMS Queue Module 548. JMS Topic Module 546 may be communicatively connected to each CTI Server in a cluster. JMS Topic Module 546 may broadcast commands to each CTI Server within a cluster. JMS Queue Module 548 may be communicatively coupled to each CTI Server in a cluster. JMS Queue Module 548 transmits the failed CTI Server ids to each CTI Server in the cluster.

Exemplary commands that JMS Topic Module 546 may broadcast include: (1) REBALANCE, (2) DROP, and (3) ASSIGN. The REBALANCE command may indicate that a CTI Server failure has been detected and a primary PG Manager Module must reconfigure the CTI Server topology. A DROP command may be broadcast to indicate that any CTI Server that is connected to a given PG disconnects from it. An ASSIGN command may indicate that a given CTI Server connect to a given PG. Other commands may be broadcast. These processes will be described in greater detail in conjunction with FIGS. 8 and 9.

When a CTI Server fails, one of the PG Manager Modules in the cluster may become the primary manager and then execute a recovery algorithm. Detecting which manager becomes the primary may involve making one or more CTI Servers within the cluster insert a record to Contention map 450 (shown in FIG. 4). For example, the first PG Manager Module that succeeds in entering its PG Manager key to Contention Map 450 may become the primary for the duration of the recovery operation. When the operation is over, the primary PG Manager Module may delete its record from the contention map 450 and relinquish its primary role.

The JMS Queue Module 548 may be read by the primary PG Manager Module within the cluster. For example, a PG Manager Module in a cluster may listen to JMS Topic Module 546 for a REBALANCE command. If the PG Manager Module is the primary for that cluster, it may be notified (or informed) of failed CTI Servers. For example, the PG Manager Module may read or access a list of failed CTI Servers from the JMS Queue Module 548 upon receiving a REBALANCE command. The PG Manager Module that has been designated as the primary may then implement a recovery algorithm. The recovery algorithm may involve reassigning the PGs attached to each failed CTI Server to other CTI Servers based on their current load. The Primary PG Manager Module may issue its command to other CTI Servers by publishing the commands to the JMS Topic Module 546, which may then broadcast them to the PG Manager Module of each CTI Server in the cluster.

As previously described, Server Configuration map 430 may indicate the state of each CTI Server (UP/DOWN). PG configuration map 420 may indicate the state of each PG and to which CTI Server it is connected.

Primary PG manager may be responsible for updating PG entries in PG configuration map 420 to indicate that they are available for connection. Each individual PG manager may update the PG entries connected to it to indicate so. This process will be described in connection with FIGS. 8 and 9.

Figure 6:
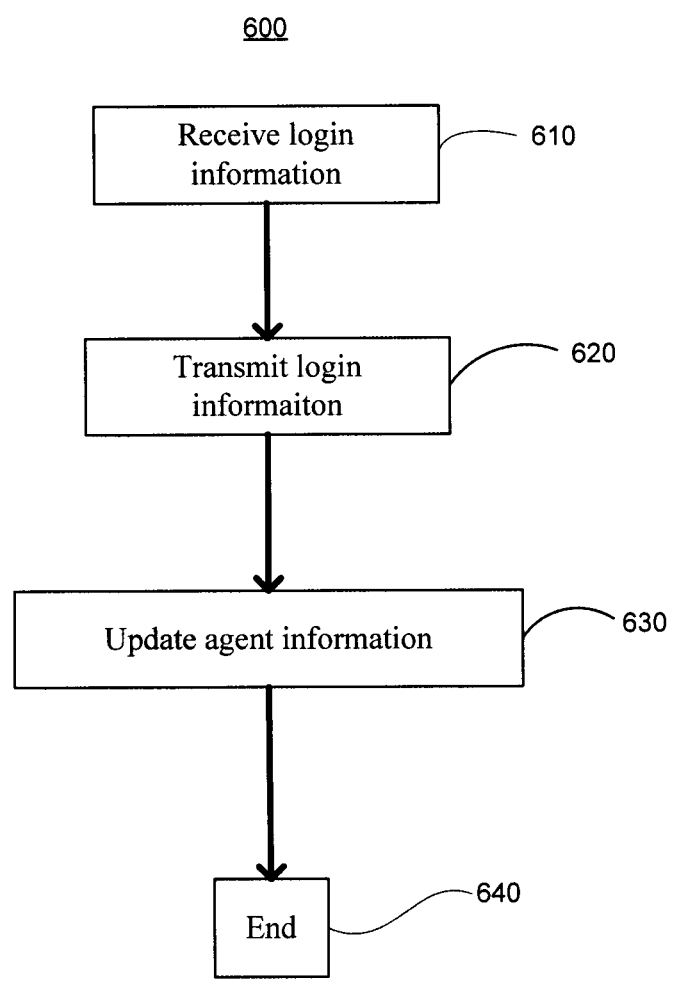
FIG. 6 is a flowchart illustrating the functionality of a particular embodiment.

FIG. 6 illustrates a flow diagram of a method 600 for an agent logging in to a CTI Server, in accordance with exemplary embodiment. This exemplary method 600 is provided by way of example, as there are a variety of ways to carry out the method. The method 600 shown in FIG. 6 can be executed or otherwise performed by one or a combination of various systems. The method 600 described below may be carried out by the CTI SOA systems 200, 300, and 500 shown in FIGS. 2, 3 and 5, by way of example, and various elements of systems 200, 300 and/or 500 are referenced in explaining the exemplary method of FIG. 6. Each block shown in FIG. 6 represents one or more processes, methods or subroutines carried out in exemplary method 600. Referring to FIG. 6, exemplary method 600 may begin at block 610.

At block 610, the CTI Server may receive login information. The login information may be received at the CTI Server's Web Dispatcher Module (as shown in FIG. 3) and from one or more agents via Browser 114. The information may be received as an http packet. The login information may include Agent id 412, Agent IP address 414, Agent port number 416, the agent security key 418, and the id of the peripheral device that the agent desires to connect to. Agent id may be a unique identifier associated with a specific agent 110. Agent id may be a series of characters. The agent IP address may be the IP address associated with the agent. Agent security key may be a unique key associated with the agent. Web Dispatcher module 132a may be configured to verify the agent's identification using the agent security key or the agent id. Routing module 142 may verify the agent's identification using the agent security key or the agent id. Web dispatcher module may include a list of agent security keys for every registered agent. Routing module 142 may include a list of agent security keys for every registered agent. Method 600 may proceed to block 620.

At block 620, web dispatcher module 132a may transmit the agent information to Routing module 142. Routing module 142 may perform one or more verification checks as described above. Method 600 may proceed to block 630.

At block 630, routing module 142 may update the agent information in the routing tables. For example, the routing module may update the information at agent map 410 (as shown in FIG. 4). Routing module may search agent map 410 to determine if the agent id from the agent information already has an entry in agent map 410. If no entry is found, Routing module 142 may create a new entry in agent map 410 and fill in the agent information. If an entry already exists, Routing module 142 may update the entry corresponding to the agent id 412 in agent map 410. Agent map 410 may include the Agent id 412 (Agent123 in the exemplary embodiment in FIG. 4). Agent map 410 may include the Agent IP address 414 (shown as 10.4.5.6 in FIG. 4). Agent map 410 may include the Agent port number 416 (shown as 5000 in FIG. 4). Agent map 410 may include the agent security key 418 (shown as KwzOf]012 in FIG. 4).

Agent map 410 may include the PG id 422 of the PG that the agent desires to connect to (shown as PG1 in FIG. 4). Agent map 410 may include an entry for the PG JMS Queue 424 that Web Dispatcher Module 132a will use to communicate solicited events to the one or more PG Adapter Modules. This PG JMS Queue may be Messaging Module 144a. In the example shown in FIG. 4, Agent 123 will use PG JMS Queue "PG1_Queue". Method 600 may proceed to block 640.

At block 640, method 600 may end.

Figure 7:
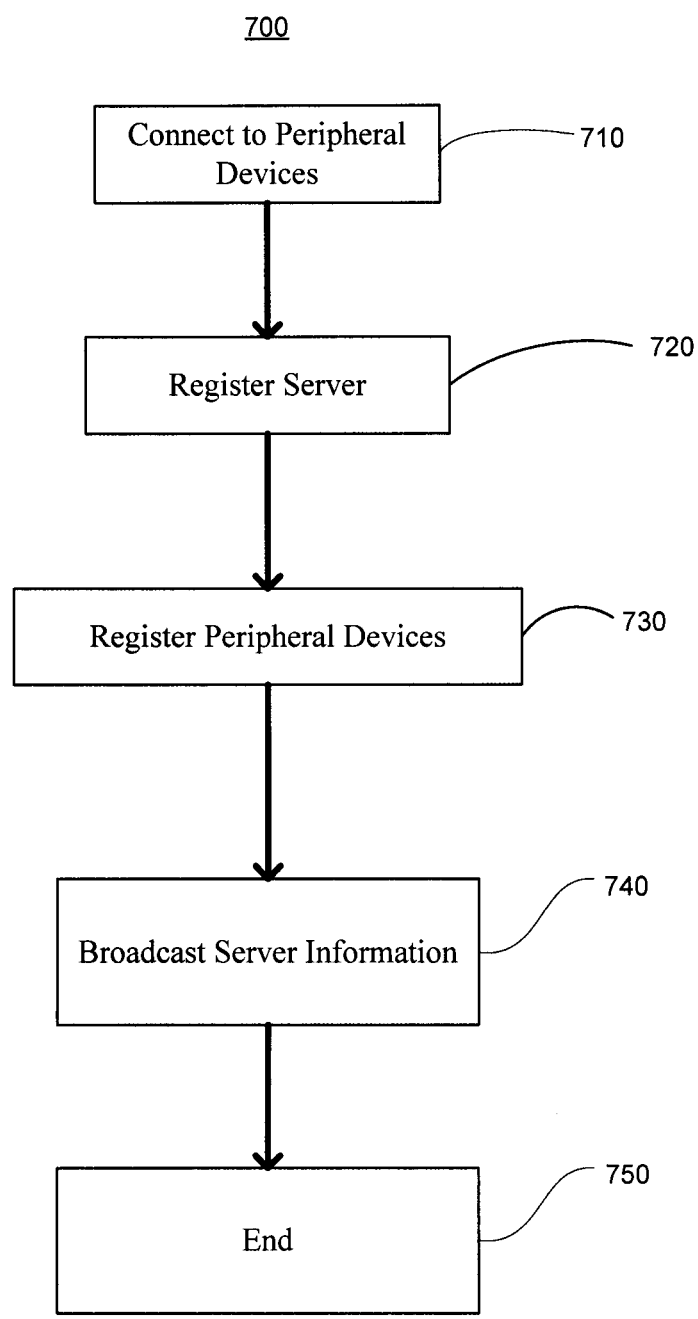
FIG. 7 is a flowchart illustrating the functionality of a particular embodiment.

FIG. 7 illustrates a flow diagram of a method 700 for initializing a CTI Server in a cluster, in accordance with exemplary embodiment. This exemplary method 700 is provided by way of example, as there are a variety of ways to carry out the method. The method 700 shown in FIG. 7 can be executed or otherwise performed by one or a combination of various systems. The method 700 described below may be carried out by the CTI SOA systems 200, 300, and 500 shown in FIGS. 2, 3 and 5, by way of example, and various elements of systems 200, 300 and/or 500 are referenced in explaining the exemplary method of FIG. 7. Each block shown in FIG. 7 represents one or more processes, methods or subroutines carried out in exemplary method 700. Referring to FIG. 7, exemplary method 700 may begin at block 710.

At block 710, the CTI Server may connect to one or more peripheral devices. The peripheral devices may be one or more PGs, such as PGs 120a-120x, as shown in FIGS. 2 and 3. The CTI Server may connect to one or more peripheral devices using one or more PG Adapter Modules, such as PG Adapter Module 136a, as shown in FIG. 3. For example, in FIG. 3, CTI Server 130a may connect to PG 120a by causing PG Interface Module 134a to instantiate PG Adapter Module 136a and connect to PG 120a. Method 600 may then proceed to block 720.

At block 720, the CTI Server may be registered with the memory grid for the cluster. For example, referring to FIG. 3, PG Interface Module 134a may send registration information associated with CTI Server 130a to Memory Grid 140. Registration information may include Server id, Server status, and the name of the JMS Topic Module 546 that CTI Server 130a is connected to for that cluster. Memory Grid 140 may include Routing Module 142 (as shown in FIG. 3). Upon receiving registration information, Memory Grid 140 may update the routing table associated with CTI Server 134a in Routing Module 142. Memory Grid 140 may use the registration information to update the Server configuration map 430 in Routing Module 142 (as shown in FIGS. 3 and 4). Routing module 142 may update or create the Server id 432, the Server status 434 ("Up" when registered), and the name of the JMS Topic Module that CTI Server 134a is connected to. Method 700 may then proceed to block 730.

At block 730, the CTI Server may register the one or more peripheral devices that it is connected to. For example, referring to FIG. 3, PG Interface Module 134a may send registration information associated with PG 120a to Memory Grid 140. Registration information may include the PG id, JMS Queue name, PG address, Configured server name, Actual Server, and PG status. Upon receiving registration information, Memory Grid 140 may update the routing table in Routing Module 142. For example, Memory Grid 140 may use the registration information to update PG Configuration map 420 in Routing Module 142 (as shown in FIGS. 3 and 4). Routing Module 142 may update or create PG id 422 (shown as PG1 in FIG. 4), JMS Queue 424 (shown as PG1_Queue in FIG. 4), the PG address 426 of PG 120a (shown as 10.5.5.5 in FIG. 4), Configured server (shown as Server1 in FIG. 4) that connects to PG 120a, and status 429. Method 700 may then proceed to block 740.

At block 740, the JMS Topic Module may announce CTI Server 134a connectivity to every CTI server in the cluster. The information may be broadcast to the PG Manager Module for each CTI server in the cluster via JMS Topic Module 546 (as shown in FIG. 5).

At block 750, method 700 may end.

Figure 8:
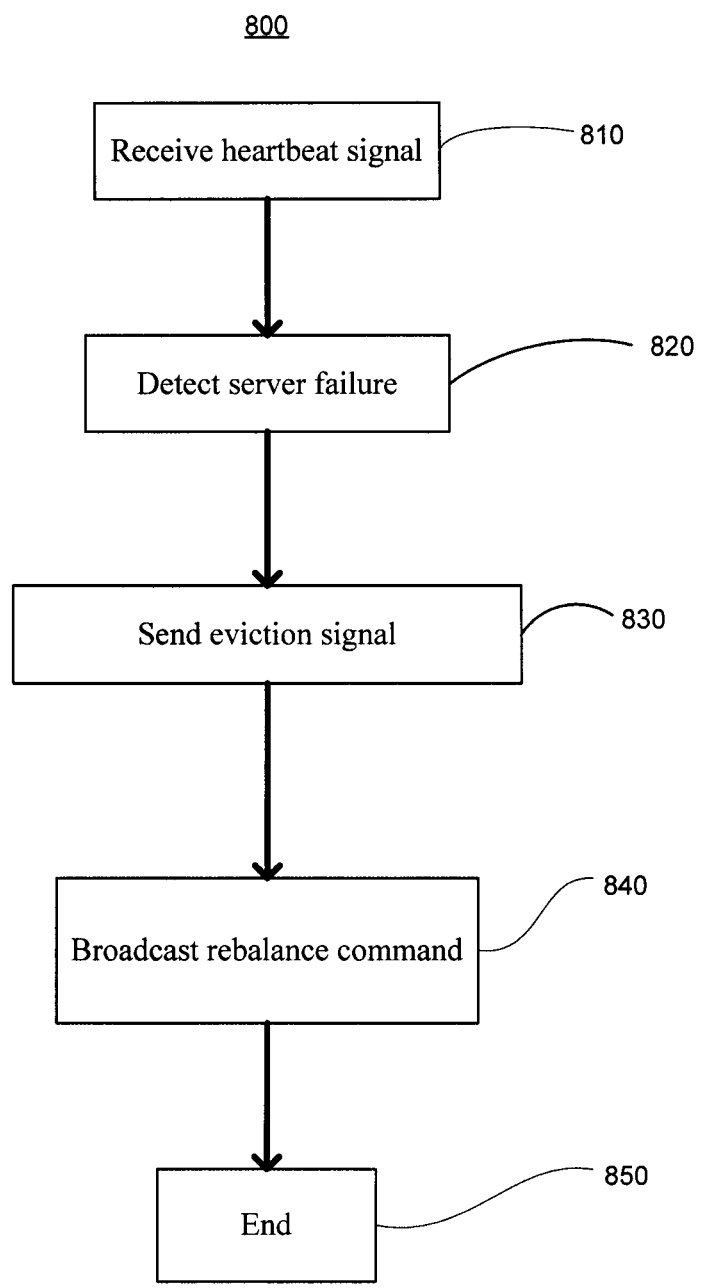
FIG. 8 is a flowchart illustrating the functionality of a particular embodiment.

FIG. 8 illustrates a flow diagram of a method 800 for detecting a CTI Server failure, in accordance with exemplary embodiment. This exemplary method 800 is provided by way of example, as there are a variety of ways to carry out the method. The method 800 shown in FIG. 8 can be executed or otherwise performed by one or a combination of various systems. The method 800 described below may be carried out by the CTI SOA systems 200, 300, and 500 shown in FIGS. 2, 3 and 5, by way of example, and various elements of systems 200, 300 and/or 500 are referenced in explaining the exemplary method of FIG. 8. Each block shown in FIG. 8 represents one or more processes, methods or subroutines carried out in exemplary method 800. Referring to FIG. 8, exemplary method 800 may begin at block 810.

At block 810, the memory grid may receive a heartbeat signal from one or more CTI Servers in a cluster. Each CTI Server within the cluster may be configured to send a periodic heartbeat signal from the Heartbeat module for that server (shown in FIG. 5). For example, each CTI Server within the cluster may be configured to send a heartbeat signal every ten seconds. Other increments may be used. The heartbeat signal may be received by Routing Module 142 and used to update Server heartbeat map 440 (as shown in FIG. 5). The heartbeat signal from each CTI server in the cluster may include the server id 432. Each time the Routing table receives a heartbeat signal, it may update Server heartbeat map 440 to include the name of the CTI Server that sent the heartbeat signal (Server1 as shown in FIG. 4) and a timestamp for when the heartbeat signal was last received (Dec. 12, 2012 11:0:0 as shown in FIG. 4). Method 800 may proceed to block 820.

At block 820, Routing module 142 may detect server failure. Routing module 142 may periodically monitor Server heartbeat map 440 to "listen" for a heartbeat signal from each CTI Server in the cluster. In one exemplary embodiment, routing module 142 may be configured to listen for a heartbeat signal every ten seconds. In other exemplary embodiments, routing module 142 may listen for a heartbeat signal at a different time increment. If Routing module 142 does not detect a heartbeat signal for each CTI Server in the cluster within the given time increment, Routing module 142 may "evict" the entry for the CTI Server from Server heartbeat map 440. Method 800 may proceed to block 830.

At block 830, Routing module 142 may send an eviction signal to Eviction listener module 542. The eviction signal may be sent in response to Routing module 142 detecting a server failure, as described above. The eviction signal may include the last entry in Server heartbeat map 440 for the failed server. The eviction signal may include the Server id 432, and the last Heartbeat timestamp 442. In response to receiving the eviction signal, Eviction listener module 542 may begin the process of reassigning the one or more PGs that were connected to the failed server to other CTI Servers. Method 800 may proceed to block 840.

At block 840, Eviction listener module 542 may send a REBALANCE command to JMS Topic module 546. The REBALANCE command may include a list of the names of the one or more CTI Servers that have failed. JMS Topic module 546 may broadcast the REBALANCE command to each PG Manager module in the cluster. Method 800 may proceed to block 850.

At block 850, method 800 may end.

FIG. 9 illustrates a flow diagram of a method 900 for recovering from a CTI Server failure, in accordance with exemplary embodiment. This exemplary method 900 is provided by way of example, as there are a variety of ways to carry out the method. The method 900 shown in FIG. 9 can be executed or otherwise performed by one or a combination of various systems. The method 900 described below may be carried out by the CTI SOA systems 200, 300, and 500 shown in FIGS. 2, 3 and 5, by way of example, and various elements of systems 200, 300 and/or 500 are referenced in explaining the exemplary method of FIG. 9. Each block shown in FIG. 9 represents one or more processes, methods or subroutines carried out in exemplary method 900. Referring to FIG. 9, exemplary method 900 may begin at block 910.

At block 910, the PG Manager Module for each CTI Server within the cluster receives the REBALANCE command from the JMS Topic Module (shown in FIG. 5). Each CTI Server in a cluster has a PG Manager Module (such as PG Manager Module 534*a* for CTI Server 130*a*, shown in FIG. 5). Method 900 may proceed to block 920.

At block 920, the PG Manager Modules determine the primary PG Manager. Upon receiving the REBALANCE command at their respective PG Manager Modules, each CTI Server within the cluster transmits a record to Contention Map 450 in Routing Module 142. The record may include a PG Manager Key (shown as 452 in FIG. 4). Each PG Manager module in a cluster may have a unique PG Manager key. When Contention map 450 receives a record, it first validates the received PG Manager key. If the key is valid, routing module 142 inputs the record. The first PG Manager Module that successfully has its record entered becomes the primary for the duration of the recovery operation. Once the routing module successfully enters a record, all other records received after that time are blocked. Method 900 may proceed to block 930.

At block 930, the primary PG Manager Module may implement a recovery algorithm. The primary PG Manager module may implement a recovery algorithm as part of the rebalancing process. The recovery algorithm may utilize the following rules:

(1) A PG that is Available and not connected to a CTI server is marked as such in the PG configuration map 420;

(2) A PG that is connected to a CTI server that has failed is marked as AVAILABLE (not connected) in the PG configuration map 420;

(3) A CTI server connects to an available PG if static configuration information states a relation between the server and the PG;

(4) Upon CTI server failure detection, all PGs connected to it are marked as available;

(5) An available PG that can't connect to its configured server is connected to the server with the least load (least number of active PG Adapter Modules);

(6) When a CTI server becomes available, all PGs associated with it in Configured server 428 (in PG Configuration map 420) get disconnected from their current CTI servers and become available so rule 1 can apply;

(7) A reassignment of a PG sends an alert to the operator via dashboard to keep him/her aware of the current situation.

The recovery algorithm may be configured so that overall PG distribution gravitates towards the static configuration. When a CTI Server becomes available or is restored, it may be assigned the PGs that it was originally configured to be connected to.

The primary PG Manager Module may update the routing tables for Server configuration map 430. The primary PG manager module may read the list of failed CTI Servers from the JMS Queue 548. The JMS Queue 548 may list the name of each CTI Server that failed, as determined using the process described in FIG. 8. The primary PG manager module may update the Server configuration map 430 in routing module 142 using the list of failed CTI Servers received from the JMS Queue 548. The primary PG Manager Module may send a signal to update the Server status 434 for each failed CTI Server in Server configuration map 430. For example, referring to FIG. 4, if CTI Server having the id of Server1 has failed, primary PG manager module may update the Server status 434 in Server configuration map 430 for Server 1 to be changed from "Up" to "Down." Primary PG Manager Module may send a signal to update the PG status for each PG connected to the one or more failed CTI Servers. The signal may be sent to PG Configuration map 420 in Routing module 412. For each PG that is connected to a failed CTI Server, the signal may cause the PG Configuration map 420 to update the status 429 to "Available."

Primary PG manager module may assign one or more peripheral devices. The peripheral devices to be assigned may be PGs that were connected to one or more failed CTI Servers. Primary PG manager may push Drop commands to the JMS Topic Module 546. The JMS Topic Module may issue the Drop commands to each CTI Server in the cluster. The Drop command includes a list of every PG that must be disconnected from a failed CTI Server. The Drop command may instruct the PG manager module for each CTI Server to disconnect its PG Adapter Module from the corresponding PG if the PG is on the list in the Drop command. Upon receiving a Drop command, if the PG Manager module determines that its PG Adapter Module is connected to a PG on the drop list, the PG Manager Module will deactivate that PG adapter module, thus effectively disconnected the PG Adapter module from the PG. In an alternative exemplary embodiment, PG servers may automatically disconnect from a failed CTI Server when that CTI Server fails.

Primary PG manager may push Assign commands. The Assign commands may be pushed to JMS Topic Module for that cluster. The Assign command may include a list of all PGs that have become available as a result of one or more CTI Servers failing. The Assign command may list which CTI Servers in the cluster will be connected to the available PGs based on load balancing information. The Assign command may assign an available PG to a CTI Server with the least load. A CTI Server in a cluster that has the least number of PGs connected to it may be determined to have the least load.

As previously stated, PG Manager Modules in a given cluster may be "listening" to the JMS Topic Module for that cluster. If a PG Manager Module of a CTI Server in a cluster detects an Assign command in the JMS Topic Module, the PG Manager Module may determine if a PG is to be connected to that PG Manager Module. If the PG Manager Module receives an Assign command that identifies an available PG that is to be assigned to its CTI Server, the PG Manager Module may activate a PG Adapter Module to connect to that available PG. The PG Manager Module may then send an update signal to Routing Module 142 for that cluster. The update signal may direct Routing Module 142 to update the PG configuration map 420 for the re-assigned PG. Specifically, the update signal may cause Routing Module 142 to update the Actual Server 427 to list the name of the CTI Server that is now connected to the re-assigned PG. Method 900 may proceed to block 940.

At block 940, primary PG Manager module may relinquish its primary role. Once the primary PG Manager has executed the recovery algorithm and issued one or more Assign commands to re-assign available PGs, the primary PG Manager may send a signal to Contention Map 450 to delete its record. Once the record has been deleted, primary PG Manager module continues to act as the PG Manager module for its corresponding CTI Server, but no longer acts as the primary PG Manager module for its cluster. Method 900 may proceed to block 960.

At block 960, method 900 may end.

FIG. 10 illustrates a flow diagram of a method 1000 for delivering a solicited event from an agent to a PG, in accordance with an exemplary embodiment. This exemplary method 1000 is provided by way of example, as there are a variety of ways to carry out the method. The method 1000 shown in FIG. 10 can be executed or otherwise performed by one or a combination of various systems. The method 1000 described below may be carried out by the CTI SOA systems 200, 300, and 500 shown in FIGS. 2, 3 and 5, by way of example, and various elements of systems 200, 300 and/or 500 are referenced in explaining the exemplary method of FIG. 10. Each block shown in FIG. 10 represents one or more processes, methods or subroutines carried out in exemplary method 1000. Referring to FIG. 10, exemplary method 1000 may begin at block 1010.

At block 1010, a CTI Server may receive a solicited event. The solicited event may be received at the Web Dispatcher module, such as Web Dispatcher Module 132a (shown in FIG. 3). The solicited event may be received from Browser 114, and may have been sent by one or more agents 110. The solicited event may be a request for information for one or more peripheral devices. The one or more peripheral devices may be one or more PGs, such as PG 120a. Method 1000 may proceed to block 1020.

At block 1020, the CTI Server may retrieve routing information. Web Dispatcher Module 132a may send information associated with the agent who sent the solicited event to Routing Module 142. The information associated with the sending agent may include the agent id, agent IP address, agent port, agent security key, etc. Routing Module 142 may retrieve routing data from Agent map 410 based on the information. For example, based on Agent map 410, if Agent123 sent the solicited event to Web Dispatcher 132a, then Routing module 142 would determine that the solicited event should be routed to PG1, via PG1_Queue. Routing Module 142 may send routing data to Web Dispatcher 132a. Method 1000 may proceed to block 1030.

At block 1030, Web Dispatcher 132a may relay the solicited event based on the received routing data. The routing data may include the name of the Messaging Module that Web Dispatcher 132a should send the solicited event to. Using the routing data shown in Agent map 410 in the exemplary embodiment of FIG. 4, Web Dispatcher 132a may relay the solicited event to Messaging Module PG1_Queue. PG1_Queue may then transmit the solicited event to its corresponding PG Adapter Module. The PG Adapter Module may then transmit the solicited event to its corresponding PG. Method 1000 may then proceed to block 1040.

At block 1040, method 1000 may end.

FIG. 11 illustrates a flow diagram of a method 1100 for delivering an unsolicited (asynchronous) event from a PG to an agent, in accordance with an exemplary embodiment. This exemplary method 1100 is provided by way of example, as there are a variety of ways to carry out the method. The method 1100 shown in FIG. 11 can be executed or otherwise performed by one or a combination of various systems. The method 1100 described below may be carried out by the CTI SOA systems 200, 300, and 500 shown in FIGS. 2, 3 and 5, by way of example, and various elements of systems 200, 300 and/or 500 are referenced in explaining the exemplary method of FIG. 11. Each block shown in FIG. 11 represents one or more processes, methods or subroutines carried out in exemplary method 1100. Referring to FIG. 11, exemplary method 1100 may begin at block 1110.

At block 1110, a CTI Server may receive an unsolicited event. The unsolicited event may be received asynchronously from one or more peripheral devices connected to CTI Server via one or more PG Adapter Modules. The one or more peripheral devices may be one or more PGs. The unsolicited event may include information for a particular agent. For example, referring to FIG. 3, PG 120a may send an unsolicited event to PG Adapter Module 136a. Method 1100 may proceed to block 1120.

At block 1120, the CTI Server may validate the routing information associated with the unsolicited event. PG Interface Module may send a signal to Routing module 142 to validate the routing information. Routing Module 142 may compare routing information associated with the unsolicited event to Agent Map 410. If the unsolicited event is validated, method 1100 may proceed to block 1120.

At block 1130, PG Adapter module 136a may relay the unsolicited event to the Http Module for that cluster (in FIG. 3, Http Module 145). Http Module 145 may act as a single queue for each CTI Server in the cluster. Http Module may include a list of each Web Dispatcher module in the cluster, and may determine the load at each Web Dispatcher module. Based on the load information, Http Module may push the unsolicited event to the Web Dispatcher Module with the least load. Http Module may determine that Web Dispatcher Module 132a has the least load, and push the unsolicited event to Web Dispatcher Module 132a. Http Module may use a round robin approach to load balancing. Method 1100 may proceed to block 1140.

At block 1140, Web Dispatcher module 132a may retrieve agent address information based on the routing data associated with the unsolicited event. Web Dispatcher Module 132a may send one or more signals to Routing Module 142. The one or more signals may include agent information associated with the unsolicited event. Agent IP address 414 may be retrieved from Agent map 410. The agent address information may be retrieved as Agent id 412. Agent address information may be retrieved as Agent port number 416. Web Dispatcher Module 132a may retrieve this or other agent address information from Agent Map 410. Method 1100 may proceed to block 1150.

At block 1150, Web Dispatcher module 132a may transmit the unsolicited event to Browser 114 based on the retrieved agent address information. This ensures that the unsolicited information is sent to the proper agent, based on the agent address information. Method 1100 may then proceed to block 1160.

At block 1160, method 1100 may end.

As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

It is to be appreciated that the set of instructions, e.g., the software that configures the computer operating system to perform the operations described above may be contained on any of a wide variety of media or medium, as desired. Further, any data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A system, comprising:
   one or more network enabled computers, each of the network enabled computers comprising:
   a web dispatcher module, the web dispatcher module communicatively coupled to one or more agents and configured to transmit events to and from the one or more agents,
   a peripheral interface module, and
   one or more adapter modules, each adapter module communicatively coupled to a peripheral device and configured to transmit events to and from the peripheral device;
   a memory device, communicatively coupled to the peripheral interface module and the web dispatcher module for each of the one or more network enabled computers;
   one or more messaging modules, each messaging module configured to transmit events between a web dispatcher module and the one or more adapter modules for a network enabled computer, and
   a queue that is communicatively coupled to the adapter module and the web dispatcher module of each of the one or more network enabled computers.

2. The system of claim 1, wherein the one or more network enabled computers are Computer Telephony Integration Servers.

3. The system of claim 1, wherein the peripheral devices are Peripheral Gateway servers.

4. The system of claim 1, wherein the one or more agents are communicatively coupled to the each of the one or more web dispatcher modules via an HTTP connection.

5. The system of claim 1, wherein the one or more messaging modules transmit events using Java Messaging Service (JMS).

6. The system of claim 1, wherein each of the network enabled computers further comprises a heartbeat module configured to send a periodic heartbeat signal to the memory device.

7. The system of claim 6, wherein the memory device comprises a routing table.

8. The system of claim 7, wherein the routing table includes at least one of an agent map, a peripheral device configuration map, a server configuration map, a server heartbeat map, or a contention map.

9. The system of claim 8, wherein the memory device is configured to periodically monitor the heartbeat signal from each of the one or more network enabled computers.

10. The system of claim 9, wherein the memory device is configured to transmit one or more commands to the peripheral interface module of each of the one or more network enabled computers in response to detecting a missing heartbeat signal from at least one of the one or more network enabled computers.

11. The system of claim 10, wherein the one or more commands includes a rebalance command, wherein the rebalance command includes a list identifying the one or more network enabled computers that failed to send a periodic heartbeat signal as one or more failed servers.

12. The system of claim 11, wherein, in response to receiving the rebalance command, at least one of the peripheral interface modules is configured to implement the following process:
    receive the list of one or more failed servers;
    instruct the memory device to update the routing table to indicate that the one or more failed servers are unavailable;
    transmit a drop command to each of the one or more failed servers, wherein the drop command instructs each of the one or more failed servers to deactivate their adapter modules;
    instruct the memory device to update the routing table to indicate that the one or more peripheral devices that were connected to the one or more failed servers are available;
    calculate the load for the remaining one or more network enabled computers; and
    transmit one or more assign commands to one or more of the network enabled computers, wherein the assign command instructs the computer to activate a new adapter module to connect to at least one of the available peripheral devices.

13. The system of claim 1, wherein the queue is configured to receive one or more unsolicited events from the one or more adapter modules and transmit the one or more unsolicited events to one of the one or more web dispatcher modules.

14. The system of claim 13, wherein the queue selects which of the one or more web dispatcher modules to transmit the one or more unsolicited events based on the traffic at each of the one or more web dispatchers.

15. A method comprising:
receiving a heartbeat signal from one or more network enabled computers;
determining whether one or more of the network enabled computers have experienced a failure event based on the received heartbeat signal;
deleting a record at a memory device associated with one of the network enabled computers if a failure event is detected at that network enabled computer;
transmitting identification information associated with the failed network computer to an event queue; and
publishing a command to a topic queue.

16. The method of claim 15, wherein the command is at least one of an Add command, a Drop command, and a Rebalance command.

17. A non-transitory computer readable media comprising code to perform the acts of the method of claim 15.

18. A method comprising:
receiving a command from a topic queue;
selecting, from a group comprising a plurality of active network enabled computers, a network enabled computer to serve as a primary manager;
receiving, at the primary manager, a list of one or more failed network enabled computers, wherein the list includes a list of one or more peripheral devices that are connected to the one or more failed network enabled computers;
updating, at a memory device, configuration associated with the one or more failed network enabled computers;
calculating the traffic at each of the one or more active network enabled computers; and
re-assigning the one or more peripheral devices to the one or more active network enabled computers based on the traffic at each of the one or more active network enabled computers.

19. The method of claim 18, further comprising, sending a signal from the primary manager to the memory device, wherein the signal causes the primary manager to relinquish its role.

20. A non-transitory computer readable media comprising code to perform the acts of the method of claim 18.

21. A method comprising:
receiving an unsolicited event from one or more peripheral devices;
validating identification information associated with the unsolicited event;
transmitting the unsolicited event to a central queue;
transmitting the unsolicited event to one of a plurality of web dispatchers;
retrieving address information based on the unsolicited event; and
transmitting the unsolicited event to one or more agents based on the address information.

22. A non-transitory computer readable media comprising code to perform the acts of the method of claim 21.

* * * * *